Dec. 1, 1942.   P. DUFFING ET AL   2,303,443
DAMPING DEVICE FOR CIRCUIT INTERRUPTERS
Filed May 1, 1941
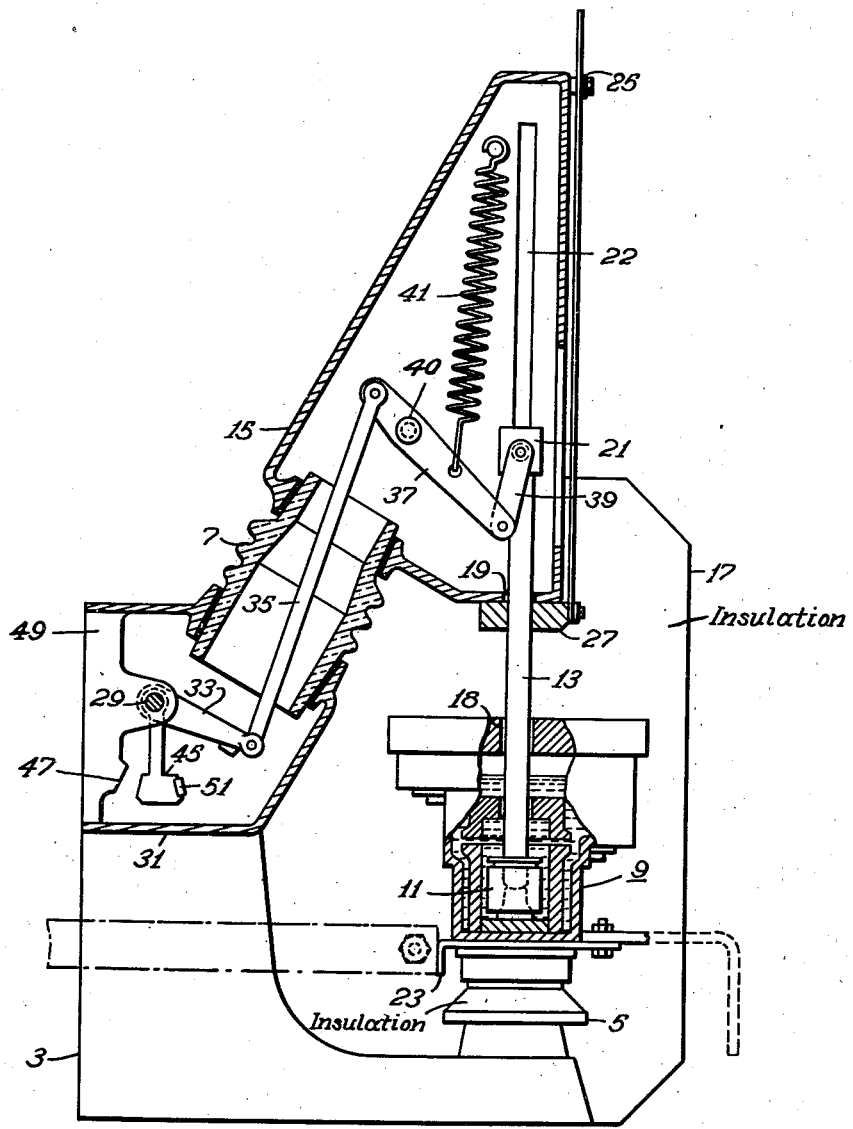
WITNESSES:
Edward Michaels
G. S. Parker
INVENTORS
Paul Duffing &
Franz Günther.
BY
Ralph H. Swingle
ATTORNEY Patented Dec. 1, 1942

2,303,443

UNITED STATES PATENT OFFICE 2,303,443

DAMPING DEVICE FOR CIRCUIT INTERRUPTERS

Paul Duffing, Berlin-Siemensstadt, and Franz Günther, Berlin-Wilmersdorf, Germany, assignors to Westinghouse Electric & Manufacturing Company, East Pittsburgh, Pa., a corporation of Pennsylvania Application May 1, 1941, Serial No. 391,240
In Germany January 8, 1940

9 Claims. (Cl. 200—153)

The invention relates to circuit interrupters and more particularly to a damping means or shock absorber for damping the termination of switching motion of the moving masses of a circuit breaker or switch mechanism to absorb the kinetic energy of the moving parts.

The use of oil dash pots for damping termination of the motion of circuit breaker lever systems is known but such devices are expensive and require continual maintenance. It has also been proposed to damp the moving masses by means of an auxiliary mass which receives an impact from the moving circuit breaker masses. In such instance, the masses are selected so that the auxiliary mass is accelerated by the impact and the circuit breaker mass is brought to a standstill. Such construction is, however, subject to several disadvantages. The first disadvantage is to be found in the fact that the auxiliary mass required for this method of damping is about the same order of magnitude as the breaker masses themselves. Another disadvantage is that the impact causes a very rapid and abrupt change of motion of the breaker which in many cases may cause an overstressing of the moving parts.

An object of the present invention is the provision of a circuit breaker or switch with a damping means for damping the termination of motion of the circuit breaker masses, which eliminates the disadvantages mentioned above.

Another object of the invention is the provision of a circuit breaker or switch with an improved damping means that is simple, compact, and inexpensive to manufacture.

In accordance with the invention, the circuit breaker is provided with a damping means comprising a movable auxiliary mass which is set in motion by impact with one of the moving breaker masses, and the auxiliary mass is smaller than the total effective mass of the moving masses of the circuit breaker. The auxiliary mass is disposed between a fixed stop and one of the main moving breaker masses, and damping is obtained by a series of successive impacts of the main breaker mass with the auxiliary mass. This construction possesses the important operating advantage that a relatively smooth damping is obtained due to the multiplicity of impacts which follow each other in short succession.

The novel features that are considered characteristic of the invention are set forth in particular in the appended claims. The invention itself, however, both as to structure and operation, together with additional objects and advantages thereof will be best understood from the following detailed description of one embodiment thereof when read in conjunction with the accompanying drawing, wherein the single figure shown is an elevational view, partly in section, of a circuit breaker embodying a damping means constructed in accordance with one embodiment of the invention.

The invention has been shown in connection with one particular type of circuit breaker for illustrative purposes only. It is to be understood that the invention in its broadest aspects is applicable to other types of circuit breakers and switches where damping of the final switching motion of the moving parts is required.

Referring to the drawing, the circuit breaker illustrated comprises an L shaped metal base 3 upon which is mounted a pair of hollow insulator columns 5 and 7 of vitreous insulating material. The lower insulating column 5 serves to support an arc extinguishing structure 9 and a stationary contact means 11 which cooperates with a movable contact rod 13. The other insulator 7 has a casing 15 secured to the upper end thereof which contains a part of the operating mechanism for moving the movable contact rod 13 to open and to closed circuit position. The casing 15 is also supported by a pair of side walls or plates 17 of insulating material which are secured to the base 3 and to the casing 15 on opposite sides thereof.

The movable contact rod 13 extends through an opening 18 in the top of the arc extinguishing structure 9 and into the casing 15 through a guide opening 19 in the bottom wall thereof. A cross head 21 is secured to the upper end of the contact rod 13 and this cross head is guided for vertical movement by lateral projections (not shown) which engage in guide slots 22 provided therefor in the side walls of the casing 15.

A pair of terminals 23 and 25 serve to connect the circuit breaker into an electrical circuit, the lower terminal 23 being electrically connected to the stationary contact means 11 and the upper terminal being electrically connected to the movable contact 13 through the agency of a contact 27 which is slidably engaged by the contact rod 13.

The operating mechanism for the circuit breaker comprises an operating shaft 29 rotatably mounted in a housing portion 31 at the upper end of the base 3, an operating lever 33 rigidly secured to the shaft 29 and connected by a link 35 to one arm of an actuating lever 37 which is pivoted intermediate its ends at 39 in the casing 15. The other and longer arm of the actuating lever 37 is pivotally connected to the cross head of the movable contact rod 13 by a link 40 to permit straight line motion of the contact rod during pivotal movement of the actuating lever 37.

The circuit breaker is biased to open circuit position by means of an accelerating spring 41, one end of which is connected to the longer arm of the actuating lever 37 and the other end of which is anchored to a pin in the casing 15 adjacent the upper end.

The operating shaft extends through the housing portion 31 and is adapted to be operated by a suitable electric or power operated closing mechanism (not shown) of any conventional trip free or non-trip free type wherein the breaker is releasably held in closed position by a latch or other releasable holding means.

Due to the masses and high speed operation of the moving parts of the circuit breaker mechanism, particularly during an opening operation thereof, it is necessary to provide a damping means to damp the termination of the switch opening movement to absorb a portion of the kinetic energy and prevent overstressing and damage of the parts. In accordance with the invention, there is provided an improved damping means which comprises an auxiliary movable mass 45 of smaller mass than the total effective mass of the moving parts of the circuit breaker, preferably about one-fourth of the total effective mass of the moving masses of the circuit breaker. The auxiliary mass is disposed between a fixed solid stop and the main moving mass of the circuit breaker so as to be set in motion by impact with the main moving mass during the later portion of the circuit opening movement of the circuit breaker. In the embodiment of the invention shown, the auxiliary mass 45 is pivotally mounted in pendulum fashion on the operating shaft 29 between a solid fixed stop 47 and the main operating lever 33 to be set in motion by impact with the operating lever 33 during the later portion of the circuit opening operation of the breaker. The solid stop forms a part of a frame 49 secured to the base 3, and is disposed to be engaged by the auxiliary mass 45 when the mass is set in motion by impact from the operating lever 33. The fixed stop serves to reflect the auxiliary mass 45 so that a series of successive impacts occur between the auxiliary mass 45 and the operating lever 33. With each impact, a part of the kinetic energy is destroyed or taken away from the moving masses of the circuit breaker by incomplete elastic reflection so that by the time the circuit breaker mechanism reaches its full open position against the stop a considerable portion of the kinetic energy has already been absorbed, thus minimizing the possibility of overstressing or damaging the parts.

In order to obtain a soft blow, the auxiliary mass 45 may be provided with an overlay 51 made of soft elastic material such as rubber or leather. In place of the freely suspended auxiliary mass 45, the auxiliary mass may be constructed in any other desired manner as for example, a sliding mass.

The damping means in addition to being of very simple and inexpensive construction has the particular operating advantage that the multiplicity of impacts and reflected impacts following each other in quick succession results in a smooth damping of the termination of motion of the mass of the moving critical breaker parts. Moreover, the damping means requires no maintenance and occupies a relatively small space.

While the invention has been disclosed in accordance with the provisions of the patent statutes, it is to be understood that various changes in the construction, arrangement and location of the parts may be made without departing from some of the essential features of the invention. It is desired therefore that the language and terms of the appended claims be given the broadest reasonable construction permissible in the light of the prior art.

We claim as our invention:

1. The combination with a circuit breaker having relatively stationary contact means and cooperating movable contact means and a mass independent of the stationary contact means moved during the entire movement of the breaker to open and to closed circuit position, of damping means for damping the movement of the mass as said circuit breaker approaches one of said positions, said damping means comprising a movable auxiliary mass disposed between a solid stop and the circuit breaker mass so as to be set in motion by impact with the circuit breaker mass during the later portion of the movement of the breaker to said one position, said auxiliary mass being smaller than the circuit breaker mass and acting to damp the motion of the circuit breaker mass by a series of successive impacts therewith.

2. A circuit breaker having relatively stationary contact means and cooperating movable contact means and a series of masses independent of the stationary contact means moved together during the operation of the breaker to open circuit position, damping means for damping the termination of motion of said masses when the breaker is moved to open circuit position comprising an auxiliary movable mass smaller than the total effective mass of the breaker masses and disposed between a fixed stop and one of the breaker masses so as to be set in motion by impact with said one breaker mass during the later portion of the opening movement of the breaker, said auxiliary mass acting to damp the termination of motion of the masses by a series of successive impacts with said one breaker mass.

3. A circuit breaker having a series of parts which are moved together during the entire movement of the breaker to open circuit position, damping means for damping the termination of motion of said parts by applying a series of successive opposing forces to one of said parts during the later portion of the opening movement of the breaker.

4. A circuit breaker having a series of masses which are moved together during the entire movement of the breaker to open circuit position, a non-fluid damping means for damping the termination of movement of the masses by applying a series of successive opposing forces to one of said masses during the latter portion of an operation of the breaker.

5. A circuit breaker movable to open and to closed circuit position, said breaker having a series of masses which are moved together during the entire movement of the breaker to one of said positions, a damping device operable by the kinetic energy of the circuit breaker masses for damping the termination of motion of the masses by applying a plurality of successive opposing forces to one of said masses during the later portion of the movement of the breaker to one of said positions.

6. A device for damping the termination of a switch motion of an electrical circuit breaker comprising an auxiliary mass disposed to be set in motion by impact with a main moving mass of the circuit breaker during the later part of a switching movement thereof, said main moving mass moving during the entire switching movement of the breaker characterized by the fact that damping is effected by a series of successive impacts of the main mass with the auxiliary mass.

7. A device according to claim 6, characterized by the fact that the auxiliary mass comprises a weight which is movably mounted between a fixed stop and the moving mass to be damped.

8. A device according to claim 6, characterized by the fact that the auxiliary mass comprises a movable weight suspended in pendulum fashion between a solid stop and the moving mass to be damped.

9. A damping device for damping the termination of switching motion of a circuit breaker, said device comprising a movable weight disposed between a fixed stop and a main movable mass of the circuit breaker that moves during the entire switching motion of the breaker, said weight being disposed to be set in motion by impact with said mass during the later portion of a switching movement of the circuit breaker, said weight being of smaller mass than the total effective mass to be damped and acting to damp the switching motion by a series of successive impacts with the main breaker mass.

PAUL DUFFING.
FRANZ GÜNTHER.